United States Patent [19]

Sterner et al.

[11] Patent Number: 4,714,866
[45] Date of Patent: Dec. 22, 1987

[54] RATE-OF-CHANGE SIGNAL GENERATOR USING SAMPLING TECHNIQUES

[75] Inventors: Rudolph J. Sterner, Cupertino; Steven Harris, Milpitas, both of Calif.

[73] Assignee: Advanced Micro Devices, Inc., Sunnyvale, Calif.

[21] Appl. No.: 856,730

[22] Filed: Apr. 28, 1986

[51] Int. Cl.[4] .............................................. G05B 21/02
[52] U.S. Cl. ..................................... 318/636; 318/616; 364/732; 333/19
[58] Field of Search ............... 318/636, 616, 561, 567; 322/19; 323/120, 121; 328/127; 333/19; 360/75, 77, 78; 364/732, 702, 178, 179, 605

[56] References Cited

U.S. PATENT DOCUMENTS

| 4,266,168 | 5/1981 | Anderson | 318/636 |
| 4,366,422 | 12/1982 | Rhodes | 318/616 |
| 4,379,256 | 4/1983 | Maury | 318/636 |
| 4,402,022 | 8/1983 | Hirota | 360/77 |
| 4,451,860 | 5/1984 | Honjo | 360/77 |
| 4,617,502 | 10/1986 | Sakave | 318/636 |

Primary Examiner—Benjamin Dobeck
Assistant Examiner—Patrick C. Keane
Attorney, Agent, or Firm—Patrick T. King; Ronald C. Fish; J. Vincent Torotlano

[57] ABSTRACT

There is disclosed herein an apparatus and method for generating a first signal related to the rate of change of a second signal. In particular, a system is disclosed for generating a velocity signal in a sampled data servo system. The apparatus uses three track and hold amplifiers one of which is also a difference amplifier to sample the position error signal at selected times. A "present" track and hold amplifier samples and holds the position error signal during the current frame. After this is done, during the same frame, a "summing" track and hold amplifier having its difference inputs coupled to the outputs of the "present" track and hold amplifier and to a "previous" track and hold amplifier samples the difference between the present position error signal and the value of the position error signal during the previous sample frame. This difference divided by the sample period gives the velocity. After the difference value is sampled, the "previous" track and hold amplifier sample is updated to the amplitude of the position error signal during the current frame in preparation for the calculation during the next frame.

11 Claims, 6 Drawing Figures

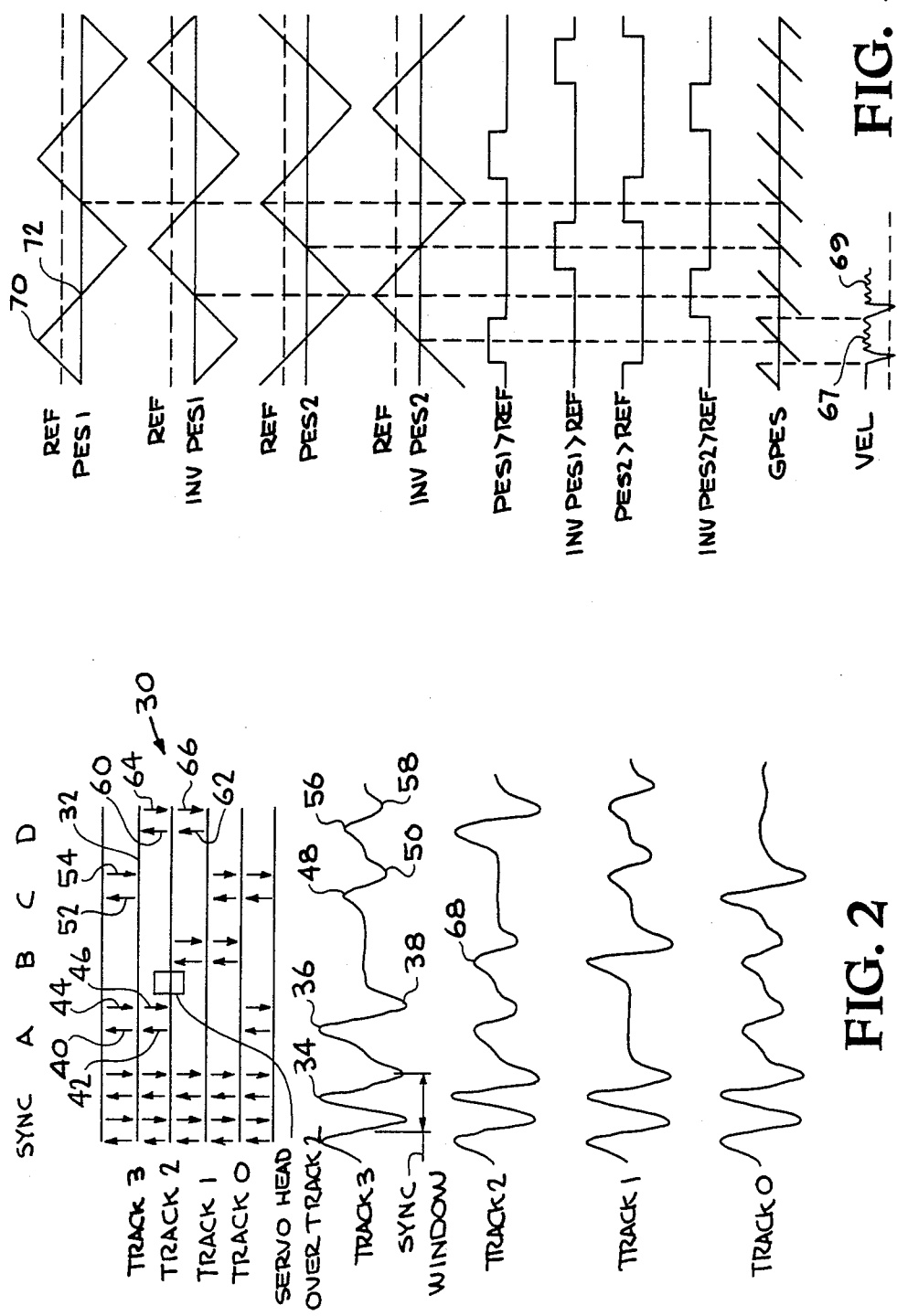

RATE-OF-CHANGE SIGNAL GENERATOR USING SAMPLING TECHNIQUES

BACKGROUND OF THE INVENTION

The invention relates generally to the field of systems to generate a signal representing the rate of change of another signal, and, more particularly, to the field of sampled data systems having circuitry to generate a rate-of-change signal characterizing certain data.

In general, when one desires to generate a first signal related to the rate of change of a second signal, it is necessary to calculate the difference in amplitude of the second signal at two different times and divide that difference by the interval between measurements of the second signal. Alternatively, one can take the instantaneous derivatives of the second signal, which is essentially the same calculation as above but with a very small interval. To do the first type of calculation, as evidenced by systems in the prior art, requires complicated multiplexing of the inputs and outputs of sample and hold circuits used to measure and store the amplitude of the second signal so as to properly apply their inputs to the second signal at different times and to properly apply their outputs to a difference calculating circuit in the right order. The latter calculation is often done using an RC network connected and having a time constant tuned to the particular characteristics of the second signal so as to act as a differentiator.

Both prior art approaches have disadvantages. The multiplexing approach is complicated and expensive because it uses many parts. Further, this approach is not well adapted to handling periodic or global discontinuities in the second signal. As a result, spikes can appear in the output signal when discontinuities appear in the input signal.

The differentiator approach is not well adapted to general applicability to a wide variety of systems involving different rates of change and different intervals between step-type or discontinuities in the signal to be measured. RC differentiators must be individually tuned for the system in which they are resident to have a time constant which is adapted for the particular characteristics of the signal to be measured. Thus, RC circuits are not well suited to broad use in a variety of systems. Further, RC circuits pass to the outputs all discontinuities which appear in the input. This causes noise in systems, crosstalk, and other related problems.

The invention has particular utility in sampled servo data disk drive controllers and other servo systems. More particularly, the invention has utility in circuitry for generating velocity signals from servo head data.

In modern disk drive systems, there are two modes of operation. In a first mode, called the track following mode, the servo system controlling the read/write head position tries to maintain the head over the center of a designated track of recorded data on the magnetic surface of the disk. The head position is maintained over track center through the use of servo data which is recorded either on the magnetic surface where the actual data is recorded and interspersed therewith, or on a separate magnetic surface dedicated to the storage of only servo data. The read/write head, or the servo head in the case of a separate dedicated servo surface, reads the servo data and outputs pulses which are used by the servo system to generate an error signal used to correct the position of the read/write head (the servo head is mechanically linked to the read/write head so that both move simultaneously). The designated track over which the read/write head position is maintained is the track which stores the desired data to be read or where data is to be written. The read/write head is moved to this track from whatever position the head previously held during the second mode called the seek mode.

In the seek mode, the servo system is given a track number to locate by the operating system or other software which does address translation from the address of the data to the actual track number on which it is stored. The servo system then causes power to be applied to the mechanism which moves the read/write and servo heads to cause the head positioning mechanism to move in the proper direction. Usually, the seek mode is performed so that a particular velocity profile is followed as the heads move from the starting position to the ending position over the desired track. This velocity profile usually involves maximum speed during the middle of the seek movement, and a gradual deceleration toward the end of the seek movement such that as the head approaches the center of the desired track, it is moving slowly enough that the servo mechanism can safely switch to the track following mode without having the heads overshoot the desired track.

The seek mode requires that the servo data coming from the read/write head or the servo head be interpreted to determine the velocity of movement as the heads move across the tracks of servo data (and actual data). In the prior art, velocity signals have been generated by differentiators comprised of resistor and capacitor combinations tuned to differentiate at the frequency of interest. The problems with this approach are multiple. First, the servo data signals are sampled analog signals which therefore have many sharp edges or transitions in them. These sharp transitions are converted by the differentiator into spikes which cause noise in the velocity signal. Second, the differentiators have to be tuned to the frequency of the systems in which they are used to cause them to act as differentiators. That is, the time constant of the RC circuit must be adjusted by adjusting the resistance and capacitance values so that the time constant is much shorter than the time it takes the signal being differentiated to make an appreciable change in level. For a circuit of general application, this is unacceptable since the manufacturer of an integrated circuit for generating the velocity signal used by the servo system does not want to have to change the circuit for every possible application in which the circuit might be used. Another goal of integrated circuit manufacturers is to minimize external components that must be used in conjunction with a particular chip. Thus, placing the RC circuit outside the chip would not be a desirable alternative.

One way of eliminating the spike problem with RC circuits is to use additional filtering to eliminate spikes and step discontinuities in either the input or the output. This additional filtering degrades the performance of the system by adding additional phase change and time delay which can cause oscillation. Further, it increases the part count and therefore the cost of the system.

Another approach which has been used in the prior art is to use three sample and hold amplifiers and a multiplexer to sample the servo data output signal at different times and subtract the sample values from each other. The sample and hold amplifiers rotate sampling the signal such that at any particular time two of the amplifiers are holding their sample values and are providing their outputs to a difference amplifier for subtraction. The third sample and hold amplifier is sampling the signal simultaneously with the processing of the two sample and hold amplifiers which are in the hold state. The rotating sample and hold states of the various amplifiers are arranged so that the most recent sample has subtracted from it the next most recent sample.

The problem with this approach is that it requires a complex multiplexing scheme to get the proper inputs switched to the right sample and hold amplifier and the proper outputs switched to the difference amplifier inputs. A further problem is that if there is any offset error in the sample and hold amplifiers, then these error will be alternately combined in different ways with alternating signs so as to affect the output in erratic fashion. This is unacceptable because offset errors are very serious in servo mechanisms for head positioning. The reason is that as the velocity nears zero close to track center of the desired track, the offset error becomes a larger percentage of the velocity signal. If the offset error exists, the situation is not good, and if the offset error varies erratically, the situation is worse because this erratic variation of the signal acts as a noise source.

Accordingly, a need has arisen for a simple, noiseless velocity generator which can meet the exacting needs of many different servo systems having different frequencies of operation.

SUMMARY OF THE INVENTION

In accordance with the teachings of the invention, a system is provided to meet the above defined needs. The invention uses three sample and hold or track and hold amplifiers (hereafter track and hold amplifiers---either type will work to practice the invention) one of which has a difference amplifier input stage and a track and hold output stage. Two of the track and hold amplifiers have their sample inputs coupled to a gated position error signal (GPES) which carries the servo data information from the servo head (or the read/write head--hereafter a dedicated servo surface and a dedicated servo head will be assumed). The GPES signal is a sampled signal which, if unfiltered, has steps therein representing the difference in peak heights of the servo data pulses detected by the servo head. This difference in pulse heights of the servo data is related to the position of the servo head relative to the track centers of the servo data tracks. Each difference in pulse heights of the servo data signals maps to a specific position of the servo head relative to the servo track centers and to a specific voltage level of the GPES signal during a particular data frame and a particular sample time. There is one sample per data frame. If the servo head is moving, the GPES signal will have one voltage level during a particular sample time and another different voltage level during the next sample time. This difference represents the distance moved between the samples, and is converted into a velocity signal by the system of the invention.

This conversion is done by causing the two input track and hold amplifiers to sample the GPES signal during each sample time and by causing the output track and hold amplifier to sample and hold the output of the difference amplifier at a time between the two sample times for the two input track and hold amplifiers. The result is that the present GPES amplitude level has subtracted from it the previous GPES amplitude level as it existed during the last sample period. The result is that the difference between the GPES signal in each sample period is computed and held for the sample period in which it was computed. The velocity signal can be derived by dividing this difference signal by a constant proportional to the sample time.

BRIEF DESCRIPTION OF THE DRAWINGS

FIG. 2 is an illustration of quadrature data flux reversals in servo data and the corresponding head output for various track positions.

FIG. 3 is a diagram illustrating the generation of the gated position error signal from the individual quadrature servo data position error signals.

DETAILED DESCRIPTION OF THE PREFERRED EMBODIMENT

Figure 1:
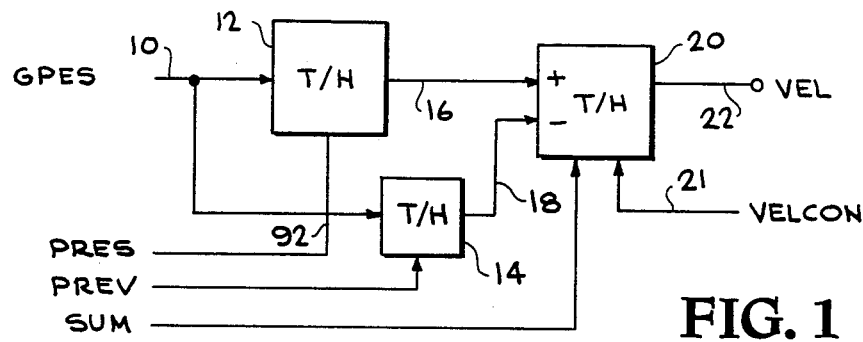
FIG. 1 is a block diagram of the invention.

Referring to FIG. 1, there is shown a block diagram of the velocity generator of the invention. The input signal GPES enters on line 10 and is coupled to the sample inputs of two input track and hold amplifiers 12 and 14. The outputs of the two track and hold amplifiers are coupled by the lines 16 and 18 to the difference inputs of an output track and hold amplifier 20. The output track and hold amplifier serves to subtract the voltage level on line 18 from the voltage level on line 16 and track and hold a sample of the difference signal for presentation on an output 22 as the VEL signal indicating the velocity of movement of the servo head and read/write head or heads across the data tracks. A VELCON input signal on line 21 serves as a means to apply external gain control.

The three amplifiers 12, 14 and 20 could also be sample and hold amplifiers. It is only necessary that the acqusition time of whatever type of sampling amplifier is used for amplifiers 12 and 14 be short enough that a sample of the voltage level of the GPES signal may be taken during each frame time with enough time left over for the other two sample and hold amplifiers to also do their sample functions within the same frame time. Typically a frame time is less than 10 microseconds, but the frame time can vary widely with the application. The hold time for the track and hold amplifiers or the sample and hold amplifiers should be long enough such that output droop between frames in dedicated systems or while over servo data in embedded systems is an acceptable level. It also has to be long enough to hold the velocity signal output constant during discontinuities in the input signal. In embedded servo systems, the hold time for the output track and hold amplifier must be long enough to hold the velocity signal steady during times when the head is over read/write data. In non-quadrature servo data systems, the hold time must be sufficient to hold the velocity signal steady during non-linear intervals in the input signal. To reduce droop in the VEL output signal, a capacitor may be connected to the "external capacitor pin" of the output track and hold amplifier 20 to provide additional storage capacity for the output node.

Those skilled in the art will appreciate that servo data is written in frames where each frame starts out with a synchronization pulse. In quadrature servo data, four servo data tracks are written adjacent to each other on the servo surface. Those skilled in the art appreciate how a position error signal can be generated from such servo data. For completeness here, a short synopsis of this process will be given here.

FIG. 2 shows the signals which the servo data head creates from the servo data for quadrature systems. The servo data flux patterns are shown at 30 for each of the four adjacent servo data tracks which correspond to four data track designated tracks 0 through 3. These flux patterns move under the servo data head with rotation of the disk. Arrows represent the positions of flux reversal which are detected by the servo head. The signals on time lines 1 through 4 represent the signal output of the servo head when positioned over the data tracks labeled tracks 0 through 3. Each servo data track corresponds to the position of a data track on the actual data surface, but offset in radial position by one half a track. When the servo data head is centered over the line 32, the data head will be centered over data track 3. The output signal from the servo data head will be as shown on time line 1 for the servo head centered over line 32.

The pulse 34 is a synchronization pulse which defines the start of the frame. The peaks 36 and 38 correspond to the flux orientations 40/42 and 44/46 respectively. The peaks 48 and 50 correspond to the flux orientations 52 and 54 respectively. Likewise, the peaks 56 and 58 correspond to the flux orientations 60/62 and 64/66 respectively. Each frame is divided into four time slots A through D as shown above the flux orientation diagram at 30. The peaks described above either occur or do not occur in these time slots as the servo head passes over the flux orientations. Sampling circuitry described in greater detail in U.S. patent application "Servo Data Demodulator" by Gershon et al. Ser. No. 794,943, filed 11/1/85, which is incorporated by reference herein, samples and holds the amplitude of all of the peaks during time slots A through D during each frame. The peak amplitudes are then subtracted from each other to derive a position error signal. In quadrature data, there are two position error signals generated. A position error signal PES1 is shown on time line 1 of FIG. 3 which shows the position error signals, multiplexer control signals and a resultant gated position error signal GPES which is generated from the two position error signals. The position error signal PES1 is generated by subtracting the amplitude of the peak in time slot A from the peak in time slot B. A second position error signal, PES2 shown on time line 3 of FIG. 3, is generated by subtracting the peak in time slot C from the peak in time slot D. The changing amplitude of PES1 can be understood by visualizing the servo head moving from over track 3 to a position over track 2 in a seek movement. In such a case, PES1 would have a certain positive value equal the peak amplitude of peak 36 minus zero since there in no peak in time slot B on time line 1 in FIG. 2. When the head has arrived over track 2, peak 36 will be diminished in size and a peak 68 will have arisen during time slot B as shown on time line 2 in FIG. 2. This means the amplitude of PES1 will have decreased during this movement corresponding to the amplitudes thereof at points 70 and 72 on time line 1 of FIG. 3. The position error signal PES2 is calculated in the same way.

Because the position error signal's amplitude shows the relative position of the heads during each frame, its rate of change in amplitude per unit of time is the head movement velocity in the radial direction. Because the servo system requires consistent amplitude and slope of the position error signal for given position and velocity for any given track, and because the position error signals PES1 and PES2 in FIG. 3 are not consistent in this regard, some signal inversions must be done to achieve this consistency. This is the reasone for lines 2 and 4 in FIG. 3. By proper multiplexing only positively sloped portions of the position error signals and their inverted counterparts are used. The multiplexing signals shown on lines 5 through 8 are used to select the proper one of the four position error signals which has a positive slope during each time slot. The resultant gated position error signal GEPS is shown on line 9 of FIG. 3.

The GPES signal is derived in a similar manner for other types of servo data such as tri-bit encoded servo data. In tri-bit data, only two time slots per frame are used and the GPES signal has a different shape. This shape is linear during certain intervals and non-linear with discontinuities during other intervals. Those skilled in the art will appreciate how tri bit data and other types of servo data are decoded to arrive at the GPES signal. The exact manner of decoding to derive the GPES signal is not critical to the invention.

The GPES signal could be differentiated by a resistor and capacitor differentiator to derive its rate of change. However, a differentiator would have to be adjusted for each application such that its time constant was much shorter than the period of the signal being differentiated. This decreases the generality of any product incorporating such a system. Further, differentiation of a discontinuity leads to a spike such as the spikes shown at line 10 in FIG. 3 at the times of the discontinuities. Further, the GPES linear portions are not really linear in sampled systems, but have step discontinuities resulting from the sampled nature of the method of generating GPES, as will become clear from study of FIG. 4. These step discontinuities, if differentiated, result in the small spikes and noise shown at 67 and 69 in FIG. 3. These spikes create noise in the system and are undesirable.

A better way of deriving the velocity information from the GPES signals is to use a sampled system since this eliminates the differentiation of discontinuities. The apparatus of FIG. 1 is such a sampled system. The manner is which it works is best illustrated by reference to FIG. 4 which shows a timing diagram of the sampling signals which cause the velocity information to be derived from the GPES input signal.

Figure 4:
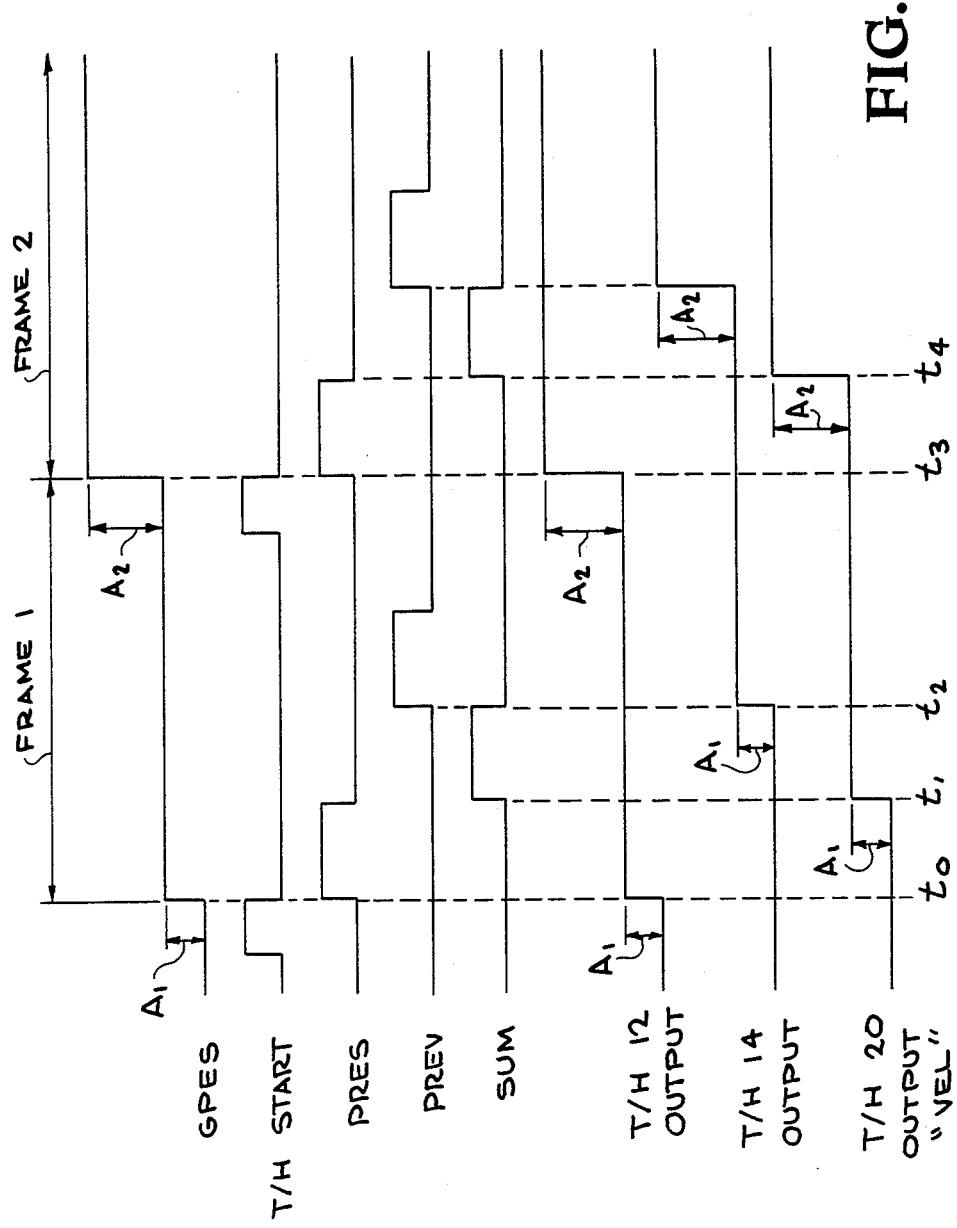
FIG. 4 is a timing diagram of the control signals which control the invention.

The GPES signal is illustrated on time line 1 in FIG. 4. The GPES signal appears as a stepwise staircase signal in FIG. 4 because the time scale is much more expanded in FIG. 4 than in FIG. 3. Each step on time line 1 of FIG. 4 represents one frame time (often about 10 microseconds) while in FIG. 3, time line 1, many hundreds or thousands of frame times may pass in moving from point 70 to 72 on the curve. On time line 2, the signal T/H START goes low at time t0 to start the sampling for frame #1. At that time, the signal PRES goes high causes track and hold amplifier 12 to take its sample. The output of track and hold amplifier 12 assumes an amplitude value of $A_1$ at time t0 as shown on time line 6. This serves as the present value of the GPES signal. While track and hold amplifier 12 is holding this "present" sample, track and hold amplifier 14 will be holding a "previous" sample which will be the GPES amplitude level from the previous frame.

At time t1, the signal SUM goes high which causes track and hold amplifier 20 to sample the difference between the amplitudes at the output of the track and hold amplifier 12 and the track and hold amplifier 14. This difference is the difference between the amplitude of GPES during frame 1 and its amplitude during the next previous frame. This difference in amplitudes is the amplitude change $A_1$ that GPES made at time t0. The amplitude at the output of the track and hold amplifier 20 is the VEL signal, and it changes by the amplitude $A_1$. At time t2 as shown at time line 8 at time t1.

At time t2, the PREV signal goes high causing the track and hold amplifier 14 to take its sample during frame #1 in preparation for updating VEL in frame #2. At that time, the amplitude at the output of track and hold amplifier 14 jumps by the amplitude difference $A_1$ to the level of GPES during frame #1 from the amplitude level of GPES during the frame previous to frame #1.

At time t3, T/H START signals the start of frame #2. At the same time, PRES goes high causing the track and hold amplifier 12 to again hold the GPES amplitude as it exists at time t3. GPES increased in amplitude by a step of amplitude $A_2$ between the sample of frame #1 and the sample of frame #2. As shown at time t3 on time line 6, the amplitude at the output of the track and hold amplifier 12 jumps by an amplitude step of amplitude $A_2$ as a result of this sample. At time t4, the SUM signal goes high, and the difference between the amplitude at the outputs of the track and hold amplifiers 12 and 14 is sampled as shown on time line 8.

The amplitude steps $A_1$ and $A_2$, when divided by the time of the sample period, is a number proportional to the velocity. Of course where the sample period is a constant time, i.e., sampling is periodic, the amplitude steps $A_1$ and $A_2$ themselves are proportional to the velocity and may be used directly as the VEL signal. Obviously, the velocity of head movement increased between the time of frame #1 and the time of frame #2 as indicated by the increase in the amplitude step from $A_1$ for frame #1 to $A_2$ for frame #2.

Of course, the system disclosed in FIGS. 1 and 4 will also work for analog GPES signals or for a filtered, sampled GPES signal. In the event of an analog GPES signal, the actual time between samples would have to be known and would be equal to the time from the trailing edge of PREV to the trailing edge of PRES with time increasing to the right. The velocity signal would then be the difference in GPES between these sample times divided by the time between samples.

Figure 5:
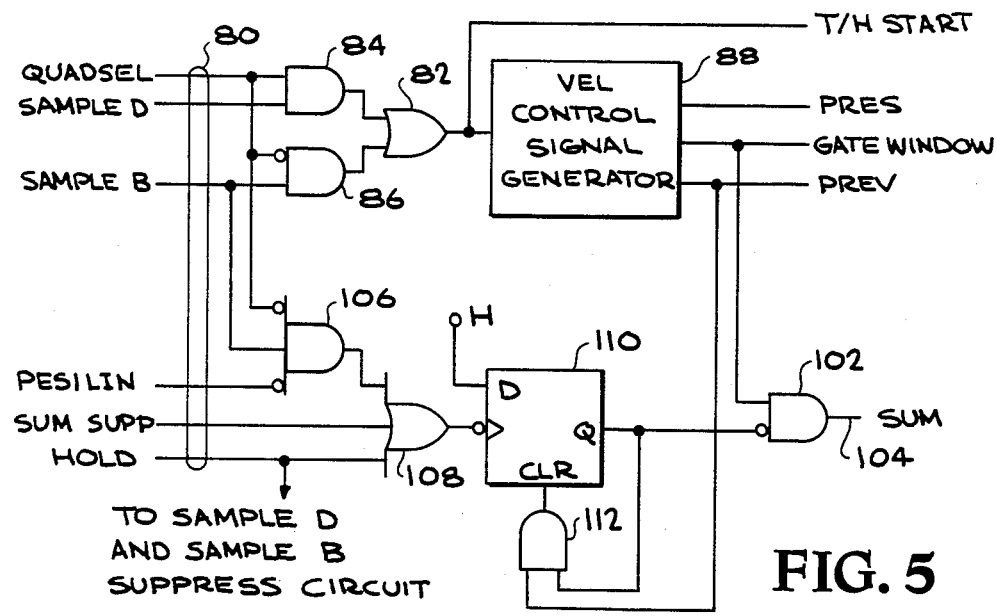
FIG. 5 is a logic diagram of the logic which generates the signals of FIG. 4.

Referring to FIG. 5 there is shown a logic diagram of the control signal generation circuitry which generates the control signals shown in FIG. 4. The signals on bus 80 serve to synchronize the generation of the PRES, PREV and SUM signals with the sampling circuitry used elsewhere to take the samples used to generate GPES every frame. Another purpose of the logic of FIG. 5 is to disable the generation of the SUM signal during certain times such as discontinuities in the input signal and while the head is over read/write data in embedded servo systems. The signal QUADSEL tells the system whether GPES is derived from quadrature data or from non-quadrature data. It is high when quadrature data is being decoded to derive GPES. The SAMPLE D signal is active high when the last sample in quadrature data has been taken during the D time slot. The SAMPLE B signal is active high when the last sample in non-quadrature data has been taken during the B time slot. These last sample signals are used to generate the T/H START signal which signals the time to start sampling to generate the VEL signal. This signal is generated by the OR gate 82 when the output of the AND gate 84 goes high or when the output of the AND gate 86 goes high. These outputs go high respectively when the QUADSEL signal goes high and the SAMPLE D signal is high or when QUADSEL is low and SAMPLE B is high. Thus T/H START goes high after the last sample needed to generate GPES is taken regardless of whether quadrature or non-quadrature data is used for servo data.

Figure 6:
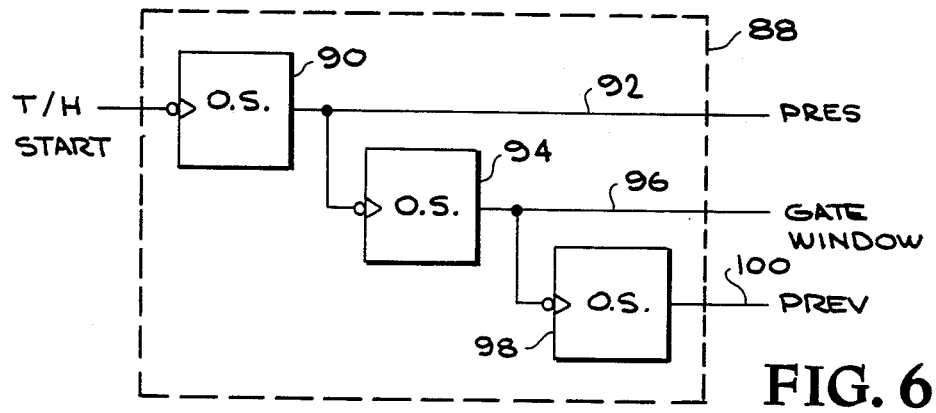
FIG. 6 is a block diagram of the sample and hold timing generator of the present invention.

The other signals needed to perform the velocity function are generated from T/H START by the velocity control signal generator 88. The details of this signal generator 88 are shown in FIG. 6. This signal generator 88 is simply a chain of three monostable multivibrators (one shots) connected in a daisy chain such that the signals PRES, GATE WINDOW and PREV will be generated in that order starting when T/H START goes low. This T/H START signal is inverted at the trigger input of a one shot 90 which responds to the falling edge of T/H START by emitting the PRES pulse on line 92. The falling edge of PRES triggers a one shot 94 which emits a GATE WINDOW pulse on a line 96. The falling edge of this signal triggers a one shot 98 which emits a PREV pulse on output line 100.

The GATE WINDOW pulse is gated through a gate 102 whose output line 104 carries the SUM signal. The gate 102 is used to disable the passage of the GATE WINDOW signal through as the SUM signal during discontinuities in the GPES signal and at other times. There are four times when disabling of the SUM signal is necessary: the trailing edge of the SUM SUPP signal, which is generated when the GPES multiplexer is switching and a discontinuity in GPES results: the non-linear portion of PES1 in non-quadrature systems, which is signaled by PES1LIN; when HOLD signal is true, which indicates when the head is over read/write data in embedded servo systems; and, on the falling edge of HOLD for at least one frame time to allow PRES and PREV to update the samples in track and hold amplifiers 12 and 14 to values which are current. The SUM SUPP SIGNAL marks the times when the multiplexer which is selecting between the various position error signals PES1, PES2 and their inverted counterparts switches from one signal to another. This prevents any generation of a VEL signal during a time when GPES may be in a transition state. The PES1LIN signal is false when PES1 is in a non-linear state. VEL would be invalid at such a time, so SUM is suppressed. The falling edge of HOLD indicates the first valid servo data frame in embedded servo data systems. While HOLD is true, all SUM generation is stopped because other circuitry (not shown) suppresses the generation of SAMPLE B and SAMPLE D, thereby preventing the latch 110 from being reset until HOLD becomes false.

The apparatus for disabling the generation of the SUM signal functions as follows. In the following description a signal name followed by a ' sign means the inverted version of the signal. An AND gate 106 with inverted inputs ANDs PES1LIN' with SAMPLE B and QUADSEL'. The output of the AND gate 106 therefore goes high only when PES1 is non-linear in a non-quadrature system at a time when the last sample has been taken in the B time slot. The output of the AND gate 106 is ORed in an OR gate 108 with SUM SUPP and HOLD, and the output of the OR gate 108 is applied to the clock input of a D type latch 110. The Q output of the latch 110 disables the SUM signal through the AND gate 102 by blocking the passage of GATE WINDOW through the gate 102 when latch 110 is set. The latch 110 is cleared by its own Q output ANDed with PREV in an AND gate 112. This insures that no new SUM signal is generated until the next PREV is generated so that the track and hold amplifier 14 will have a current PREV value against which the GPES value for the next frame may be compared.

The key features of the invention include the ability to ignore discontinuities in the input signal by virtue of the synchronization of the velocity signal generation with the sampling process used to generate the position error signals without the extra noise of a multiplexer in the signal path which erratically switches signs of offset errors in the differencing circuitry. Other discontinuities in the input signal may also be ignored by use of the invention. Other key features include the frequency independence of the system, its simplicity and elimination of the need for filtering of noise at the input or the output of the velocity generation circuitry.

Although the invention has been described in terms of the preferred embodiment illustrated herein, those skilled in the art will appreciate many modifications which may be made without departing from the true spirit and scope of the claims appended hereto. All such modifications are intended to be included within the scope of the appended claims.

What is claimed is:

1. An apparatus for generating a first signal related to the rate of change of a second analog signal which has a constant value during each of a plurality of successive frame sample times comprising:
   a first track and hold amplifier for tracking and holding the amplitude of said second signal at a first time during each frame sample time;
   a second track and hold amplifier for tracking and holding the amplitude of said second signal at a second time during each frame sample time;
   means for determining the amplitude difference in the amplitudes of the samples held in said first and second track and hold amplifiers; and
   means for tracking and holding the amplitude of the difference signal at a third time between said first and second times in each successive frame sample time following the first frame sample time.

2. An apparatus for generating a first signal related to the rate of change of a sampled second analog signal which is sampled during each of a plurality of sample frame times comprising;
   means for sampling the amplitude of said second signal at different times to create a present sample taken at a first time during each one of said sample frame times and a previous sample taken at a second time during each same sample frame time during which said present sample was taken of the amplitude of said second signal; and
   means for sampling and holding the amplitude difference between said present and previous samples at a third time between each said first and second times of the taking of said present and previous samples after the first previous sample is taken and for providing the difference of the amplitudes of said present and previous samples as an output signal related to the rate of change of said second signal.

3. An apparatus for generating a first signal related to the rate of change of a second sampled analog signal during each of a plurality of successive sample frame times comprising;
   means for sampling and holding the amplitudes of said second signal to form a present sample and a previous sample of the amplitude of said second signal at two times within each said sample frame time while said second signal is of constant value before said second signal changes to its new amplitude, if any, during a second, successive one of said sample frame times, said two sampling times being separated from each other by an interval; and
   means for calculating the amplitude difference between said present and previous samples at a time within said interval during selected ones of said sample frame times starting with the second one of said sample frame times and for providing the difference amplitude as an output signal related to the rate of change of said second signal.

4. The apparatus of claim 3 further comprising control means coupled to said means for sampling and holding and coupled to said means for taking the difference for generating control signals which control the timing of taking of said present and previous samples and the calculation of the difference between said sample amplitudes and for receiving control signals which indicate when the second signal is in a non-linear or discontinuous state and when said second signal is valid and for preventing the taking of said difference when said second signal is in a non-linear or discontinuous state.

5. The apparatus of claim 4 wherein said control means further receives control signals indicating when said previous sample is to be taken during any particular sample frame time and for causing the calculation of said amplitude difference to commence after said present sample has been taken.

6. A method of deriving a first signal related to the rate of change of a sampled second analog signal which is calculated during each of a plurality of consecutive sample frame times from position error samples of position error data indicating position errors comprising the steps of:
   taking first and second samples of said second analog signal at first and second times during each said sample frame time;
   subtracting the amplitude of the sample which is taken first in a first said sample frame time from the amplitude of the sample which was taken second in the next previous said sample frame time;
   outputting the difference as said first signal related to the rate of change of said second signal.

7. The method of claim 6 wherein the step of taking said first and second samples includes taking said first and second samples within said sample frame time when said second signal is constant and before it changes to its new value during the next said sample frame time and wherein the step of subtracting is performed during the interval between when said first and said second samples are taken during any particular sample frame time.

8. The method of claim 7 further comprising the step of preventing the subtracting step from being performed during times when said second signal is in a non-linear or discontinuous state.

9. The method of claim 8 further comprising the step of determining a starting time for the taking of the first and second samples needed to generate said first signal after the time of taking of said position error samples needed for calculation of said second signal, said determination of starting time being made from control signals indicating what type of position error data is being used to calculate said second signal and from the time of taking of the position error samples needed to calculate said second signal.

10. The method of claim 6 using first and second track and hold devices to take and store said first and second samples and further comprising the steps of always storing said first sample in said first track and hold device and always storing said second sample in said second track and hold device.

11. The method of claim 10 further comprising the step of preventing the subtracting step from being performed during times when said second signal is in a non-linear, discontinuous state.

* * * * *